July 29, 1924.

E. C. CLARK ET AL 1,503,300

AUTOMATIC FILM WINDING CAMERA

Filed Dec. 15, 1922     5 Sheets-Sheet 1

Fig.1

INVENTORS
EZRA C CLARK
JOHN F POLHEMUS
BY
Philip S. Hopkins
ATTORNEY

July 29, 1924.  
E. C. CLARK ET AL  
1,503,300  
AUTOMATIC FILM WINDING CAMERA  
Filed Dec. 15, 1922  
5 Sheets-Sheet 2

Fig. 2          Fig. 7

INVENTORS  
EZRA C CLARK  
JOHN F POLHEMUS  
BY  
*Philip S. Hopkins*  
ATTORNEY

July 29, 1924.

E. C. CLARK ET AL

1,503,300

AUTOMATIC FILM WINDING CAMERA

Filed Dec. 15, 1922   5 Sheets-Sheet 4

INVENTORS
EZRA C CLARK
JOHN F POLHEMUS
BY
Philip S. Hopkins
ATTORNEY

July 29, 1924.

E. C. CLARK ET AL

1,503,300

AUTOMATIC FILM WINDING CAMERA

Filed Dec. 15, 1922  5 Sheets-Sheet 5

Inventors
Ezra C. Clark
John F. Polhemus

By Philip S. Hopkins
Atty.

Patented July 29, 1924.

1,503,300

UNITED STATES PATENT OFFICE.

EZRA C. CLARK, OF BINGHAMTON, AND JOHN F. POLHEMUS, OF JOHNSON CITY, NEW YORK, ASSIGNORS, BY MESNE ASSIGNMENTS, TO ANSCO PHOTOPRODUCTS, INC., OF NEW YORK, N. Y., A CORPORATION OF NEW YORK.

AUTOMATIC FILM-WINDING CAMERA.

Application filed December 15, 1922. Serial No. 607,246.

*To all whom it may concern:*

Be it known that we, EZRA C. CLARK and JOHN F. POLHEMUS, both citizens of the United States, and residents, respectively, of the city of Binghamton, county of Broome, and State of New York, and Johnson City, county of Broome, and State of New York, have invented certain new and useful Improvements in an Automatic Film-Winding Camera, of which the following is a description, reference being had to the accompanying drawings, in which like reference numerals indicate like parts.

This invention relates particularly to that type of camera wherein the strip of sensitized film is automatically shifted after each operation of the camera to make an exposure on said film, thus placing an unexposed portion of the film into position for the next exposure. By this method of operation, which is controlled entirely by the shutter actuating mechanism of the camera, double exposures on a single section of film are completely avoided; also the necessary hand winding of the film is eliminated which assures much greater speed in the operation of the camera.

Heretofore the principal objection to cameras of the automatic film winding type has been the fact that no adequate and positive compensating means has been provided for the mechanism which drives the take up spool of the camera to wind the film thereon. The diameter of the take up spool varies as the film is wound thereon, therefore some means must be provided to compensate for such varying diameter of the spool, in order that the same length of film will be drawn across the exposure chamber at each operation of the device.

It is the principal object of this invention therefore, to provide the automatic winding mechanism with a compensator for positively and accurately causing uniform lengths of film to be successively positioned for exposure. It is a further object of our invention to provide the motor driven mechanism of this device with a governor to regulate the speed of the motor and keep the same uniform throughout its operation. It is very essential to the practical operation of this type of camera that some means be provided for this purpose and we believe that we have devised a novel and very practical type of governor, which is especially adapted for this service.

A third object is the provision of a device for insuring the operation of the releasing mechanism. It has very frequently occurred in the operation of a camera of this character that due to the quick action of the releasing means, the releasing pawl will snap back into a restraining position before the motor has started the winding mechanism. We have, therefore, provided a device which cooperates with the releasing and restraining means to compel complete operation of the same.

It is a still further object of our invention to provide an improved stop device for the driving mechanism, and to associate with the same a novel form of releasing means which is actuated automatically at each operation of the shutter mechanism.

Our invention is an improvement upon that patented in and by United States Letters Patent No. 1,197,901, dated September 12, 1916; No. 1,216,543, dated February 20, 1917; and No. 1,268,805, dated June 4, 1918, all issued to Ansco Company as the assignee of Carl Bornmann, Ezra C. Clark and George W. Topliff.

Other objects and advantages in details of construction and operation will be apparent as the description proceeds, reference being had to the accompanying drawings wherein like reference numerals indicate like parts.

Our improved camera is indicated generally by the reference character 1, and is provided with the usual bellows 2, front board 3, lens carriage 4, shutter 5, finder 6, carrying handle 7, and flexible wire shutter release 8. These parts are all of well known construction and require no detailed description here.

The primary actuating means for our improved camera comprises in general an attachment mounted upon the lens carriage, controlled by the wire release 8, and operating the shutter and the controlling lever for the film winding mechanism.

More specifically this primary actuating means comprises a sliding bar or lever designated at 9. This bar 9 extends vertically immediately back of the lens carriage 4 and is provided near its lower end with a pin 10, said pin having sliding engagement with a slotted bracket 11, secured to the lens carriage as shown clearly in figure 2. This pin and slot connection serves to guide the lever 9 when the same is reciprocated in a manner about to be described.

The lever 9 is provided at its upper end with a right angled extension 12, extending toward the front to a plane parallel with the shutter lever 13. At its free end the extension 12 is bent at right angles forming an ear 14, to which is pivotally secured the shutter lever 13.

Centrally of the extension 12 and extending downwardly therefrom is a lip or projection 15, which is bent inwardly at its lower end as at 16. This bent projection 16 terminates directly beneath the end of the wire shutter release 8, which when operated exerts a pressure thereon, thereby pressing the lever 9 downwardly. Due to the connection between the lever 9 and the shutter lever 13 it will be readily understood that as the lever 9 is pressed downwardly due to the actuation of the wire release 8, the lever 13 will also be carried downwardly resulting in the actuation of the shutter.

Figure 1:
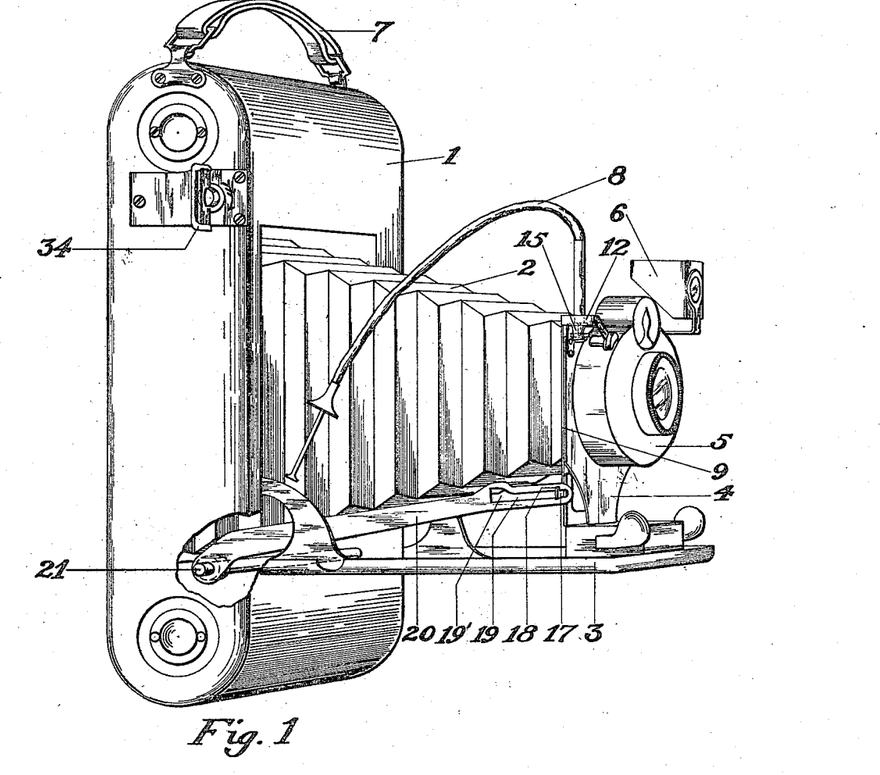
Figure 1 is a perspective view of a camera of the character described, showing the mechanism for controlling the operation of the shutter and of the film winding mechanism, certain parts being broken away to show details of construction.
Figures 2, 7:
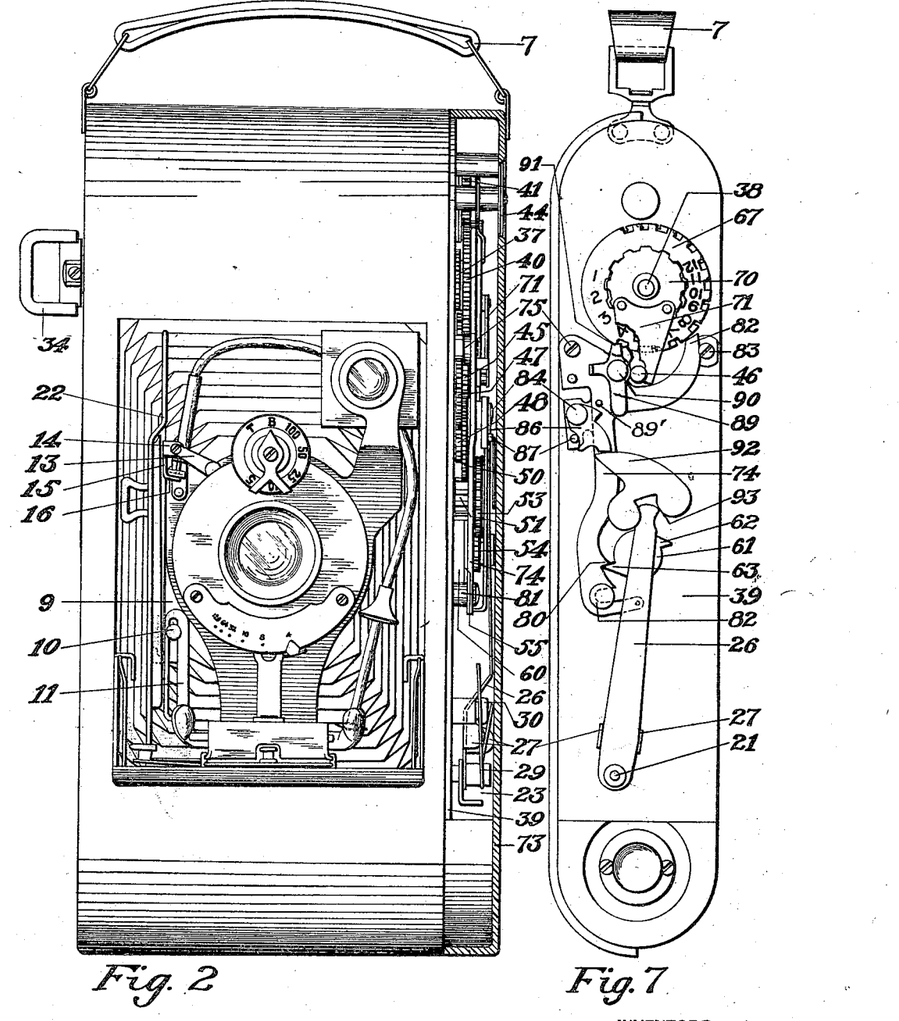
Figure 2 is a front view of the camera in its folded position and with the front board lowered to show the position of the primary actuating parts when the camera is in its closed position; also in this figure a section on the side of the camera has been removed to show in side elevation the film winding mechanism.
Figure 7 is a side view with the gear train removed for clearness in illustrating the compensator, stop lever and operating lever.

The lower end of the lever 9 is provided with an offset portion 17 having an enlarged end 18 as shown clearly in Figure 1. This offset portion 17 is adapted for engagement in a slot 19 in the outer end of a lever 20. This lever 20 is rigidly mounted upon a shaft 21 extending across the camera directly beneath the inner end of the bellows. The lever 20 as shown clearly in Figure 2 is offset near its outer end as illustrated at 22, and as shown, the slot 19 has an enlarged portion 19′ located at such offset. The purpose of this construction will be readily understood, for when the lens carriage is pushed back into the camera preparatory to folding up the same, the enlarged end 18 of the offset 17 passes thru the enlarged end 19′ of the slot 19, thus disconnecting the lever 9 from the lever 20 and permitting the lens carriage to be pushed back into the camera body without obstruction. Also as soon as the end 17 of the lever 9 is disengaged from the slot 19 in the offset portion 22 of the lever 20, said lever 20 is free to rock the shaft 21 in a manner to permit said lever 20 to be folded back within the camera in a manner clearly shown in Figure 2. These parts and their operation are clearly described in Letters Patent No. 1,268,805 mentioned above.

The end of the shaft 21, opposite that upon which the lever 20 is mounted, extends into the compartment 23 which is formed on the right hand side of the camera (as shown in Figure 2) for the purpose of housing the winding mechanism of the camera. Rigidly secured to this projecting end of the shaft 21 is an arm 24, shown clearly in Figures 3 and 4. This arm 24 has at its free end an offset portion 25 forming an ear which bears against the operating lever in a manner about to be described.

This operating lever, indicated at 26, is pivoted for free movement upon the end of the shaft 21 and has near its lower end two upstanding bearing lugs 27. Mounted within these lugs and extending thru the same is an adjusting screw 28, one end of which projects outwardly into the path of the ear 25. A coil spring 29 having one end anchored against a rigid post 30 and the opposite end bearing against one of the lugs 27 as shown in Figure 4, continuously exerts pressure on said lug, thereby normally forcing the operating lever 26 to the right as shown in Figure 4, and by virtue of the adjusting screw 28 bearing upon the ear 25 normally holds the shaft 21 in such position as to cause the lever 20 to be slightly raised in position to engage the end 17 of the sliding bar 9, and as will be readily understood, such position can be adjusted to varying degrees thru the operation of the adjusting screw 28.

Because of the construction just described it will be seen that the great simplicity in arrangement of parts provides an efficient and easily operated camera attachment, which in no way interferes with the ordinary or regular operation of the camera. When the lever 20 is folded back into the camera into the position shown in Figure 2, the shaft 21 is rocked in its bearings, and the arm 24 at the opposite end thereof, assumes the position shown in dotted lines in Figure 4.

Figures 3, 4:
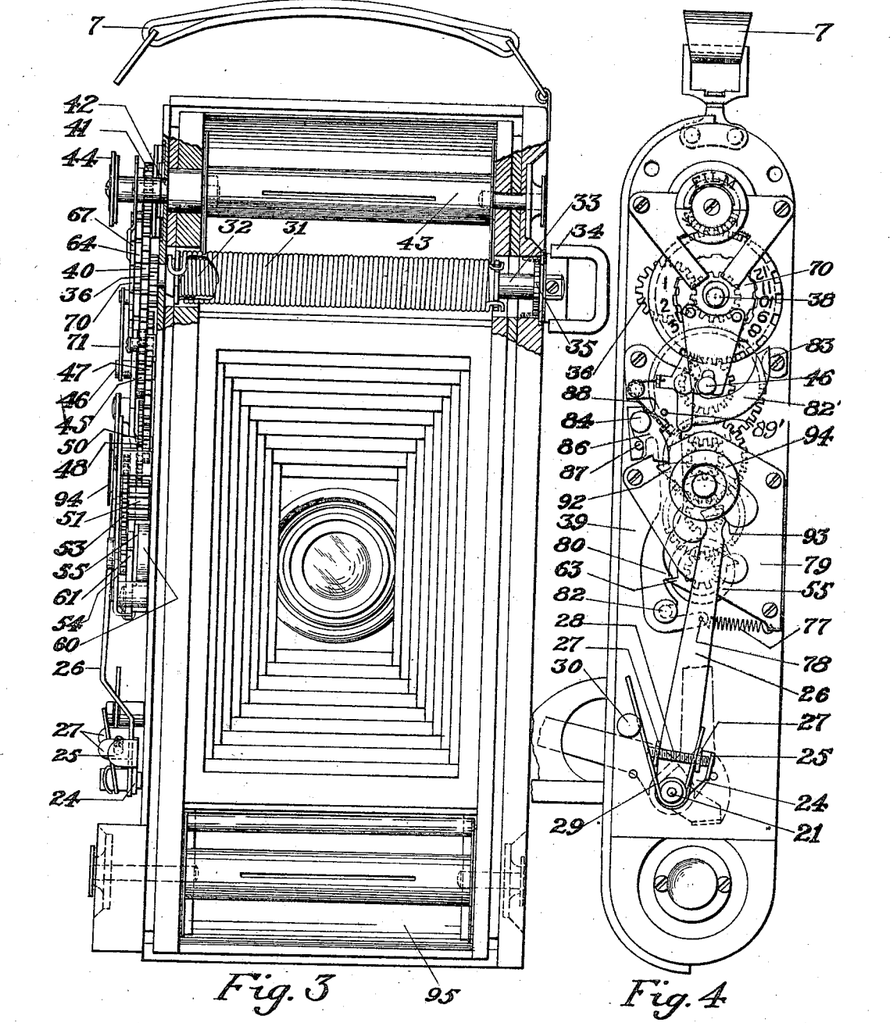
Figure 3 is a rear view of the camera with the back and side removed therefrom and with parts broken away showing details of construction of the motor and the winding mechanism.
Figure 4 is a side view of the camera with the cover removed showing the complete assembly of parts which make up the winding mechanism.
Figure 5:
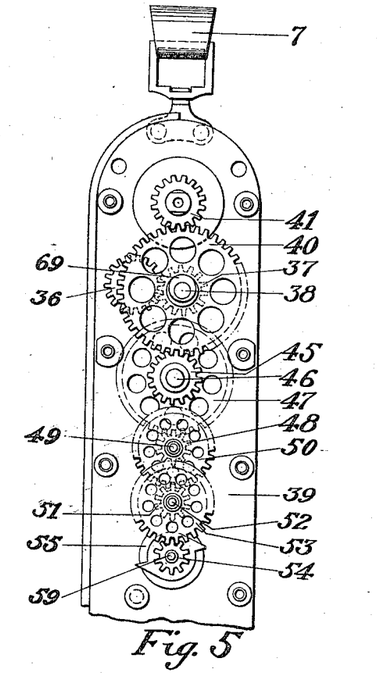
Figure 5 is a detail side view showing the gear train which drives the operating parts of the winding mechanism.

Referring now to Figure 3, it will be seen that the motor for driving the winding mechanism is located entirely within the camera directly beneath the take up spool. It may be covered over with any suitable covering, such as a metal casing which conceals the same and renders it dustproof. The motor used in this camera, and which is the preferred form because of its smallness in size and adaptability to the conventional type of cameras, is the same as that shown and described clearly in Letters Patent No. 1,197,901, above mentioned and comprises generally an ordinary spiral spring indicated at 31, and a smaller spiral spring indicated at 32 fitting telescopically within said spring 31. A shaft 33 extends thru these springs and is attached thereto in the manner clearly described in the before mentioned patent. Suffice it to say here that such motor is provided with a winding key 34, and a pawl and ratchet device 35 at one end, and at the opposite end with a driving gear 36, the arrangement of these parts being such that upon the manual rotation of the winding key 34, the spring motor is thereby placed under tension and so held by the pawl and ratchet device 35, in much the same manner of operation as the ordinary clock spring. The function of this motor is of course to drive the take up spool of the camera to wind the film thereon.

The driving gear 36 of the motor shaft 33 meshes with a pinion 37, journaled at 38 on the base plate 39. This base plate extends lengthwise along the side of the camera and upon the same is mounted the gear train and other mechanism, which drives the take up spool.

Rigid with the gear 37 is a larger gear 40, the teeth of which mesh with a pinion 41 mounted upon the driving trunnion 42 of the take up spool 43. The operation of this gear 41 together with the operation of its correlated parts, including a manually controlled winding key 44 and pawl and ratchet connection, between the shaft 42 and gear 41, is clearly described in the above mentioned Letters Patent No. 1,197,901 and therefore needs no detailed description herein. It will be understood of course that such construction permits of rotating the take up spool 43, which is removably trunnioned on said shaft 42, by a conventional key and slot arrangement, by manual manipulation of the winding key 44, independent of the motor driven mechanism, and also provides for the rotation of said shaft in the same direction thru the medium of gears 36, 37, 40 and 41.

Figure 11:
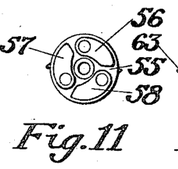
Figure 11 is a bottom view of the same showing the construction of the governor.

Because of the extraordinary strength of the motor required to wind the film upon the take up spool it is essential that some means be provided for regulating the speed of such a motor. We have therefore, provided a governor for this purpose which is driven from the motor by a train of gears as follows: The gear 40 meshes with the pinion 45, journaled on the base plate 39 at 46, which pinion carries a larger gear 47 meshing with a pinion 48, journaled at 49, and carrying the gear 50, which in turn meshes with pinion 51, journaled at 52 and carrying the gear 53. The gear 53 meshes with and drives the small pinion 54, which is rigidly secured to a rotatable disk 55. As shown clearly in Figure 11 this disk 55 has loosely pivoted thereon three small levers indicated at 56, 57, and 58. The disk 55 is journaled at 59 and acts as a rotatable top for a small circular housing 60 into which the pivoted levers 56, 57, and 58 extend. It will be readily understood that as the disk 55 is rotated thru the medium of gear 54, the free ends of the said levers secured to the disk will be thrown outwardly thereon by centrifugal force and will bear against the inner wall of the housing 60. The greater the speed of rotation of the disk 55, the greater the force with which said levers will bear against the wall of the housing 60 and thus govern the speed of the driving mechanism. This type of governor is especially to be preferred over the familiar escapement type or other forms because of its smallness and particularly because of its quietness in operation.

Also rigidly secured to the disk 55, between the gear 54 and said disk, is a wheel 61 having two oppositely directed teeth or stops indicated at 62 and 63. The purpose of this disk 61 will be more fully described as the description proceeds.

The compensating mechanism heretofore mentioned is comprised as follows: Loosely mounted upon the hub 38 of gear 40 is a wheel 64 having internal gear teeth 65 and provided in its outer periphery with unevenly spaced notches 66. Superimposed upon the wheel 64 is a ring 67, also having unevenly spaced notches 68 in its outer periphery, said notches being slightly offset from the notches 66. The purpose of this ring 67 will be described later.

Figure 6:
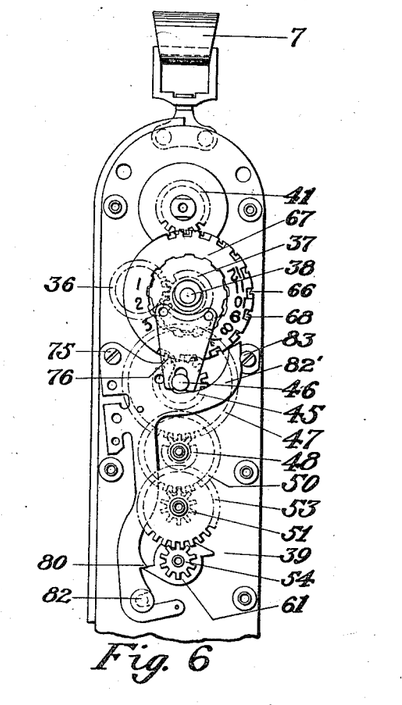
Figure 6 is a view similar to Figure 5 with the compensator and stop lever shown in position.
Figures 8, 9:
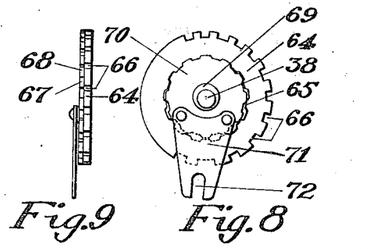
Figure 8 is a plan detail view of the compensator, with certain parts removed for clearness.
Figure 9 is a side view thereof, complete.
Figure 10:
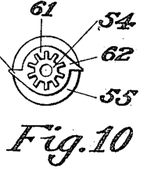
Figure 10 is a plan view of our improved governor showing in detail the parts thereof, which cooperate with the stop lever.

Carried by the gear 40 and mounted eccentrically of the center thereof is a cam 69, which is eccentrically mounted upon and rotates with the gear 40. Loosely mounted around the cam member 69 is a gear 70, the teeth of which mesh with the internal gear teeth 65 of the wheel 64. Mounted upon the gear 70 is a guide plate 71 (shown clearly in Figure 8), the free end of which is provided with a slot 72, which engages with and is guided by the journal pin 46. It will be readily understood that upon rotation of the cam 69, an oscillatory movement will be imparted to the gear 70 which, guided by the slot 72 sliding on the post 46, will bring the teeth of said gear into mesh with the internal gear 64, causing the same to rotate slowly. As shown in Figures 4, 6 and 7, the ring 67 is provided with the numerals 1 to 12 inclusive. These numerals are spaced apart in accordance with the uneven spacing of the notches 68. A suitable window or peep opening may be provided in the cover 73 which encloses the driving mechanism, and which may be removably secured to the camera in any conventional manner in order to provide ready access to such mechanism. This peep hole (not shown) may be so positioned that the numerals above referred to will appear successively thereunder and thus indicate to the operator the number of exposures already taken and the number left on his film. Such an arrangement is clearly shown and described in the above mentioned Patent No. 1,197,901.

Figure 12:
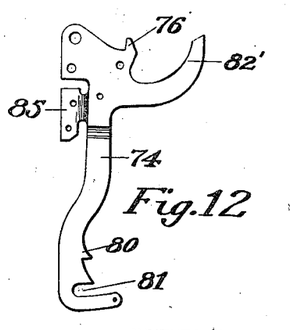
Figure 12 is a detail of the stop lever.
Figure 13:
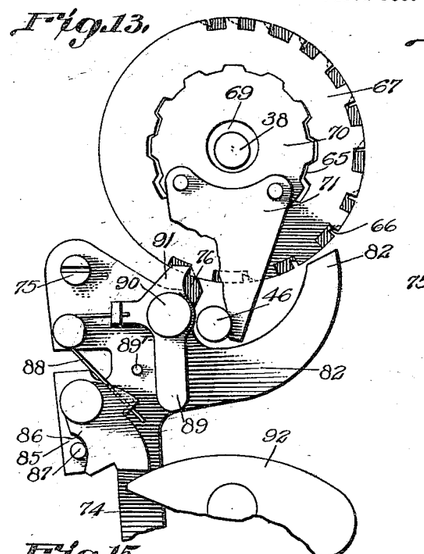
Figures 13 to 16 inclusive show on an enlarged scale successive stages in the operation of the stop lever pawls cooperating with the notched ring and wheel.
Figure 14:
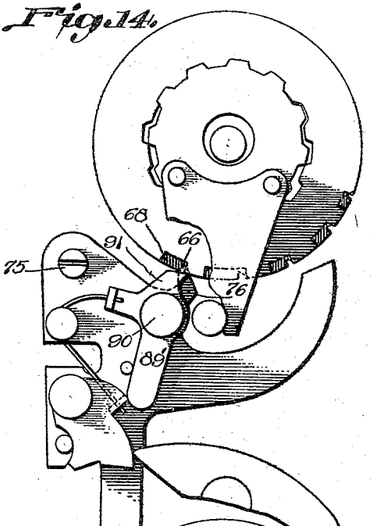
Figure 15:
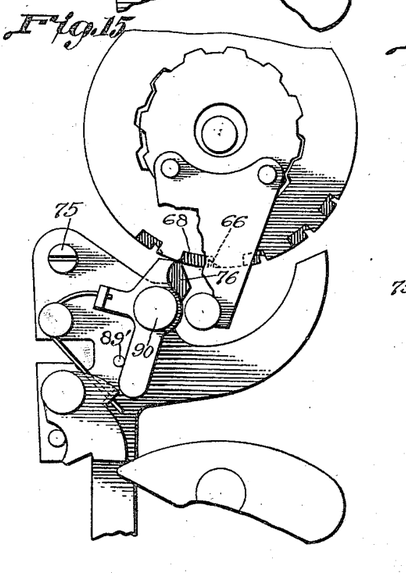
Figure 16:
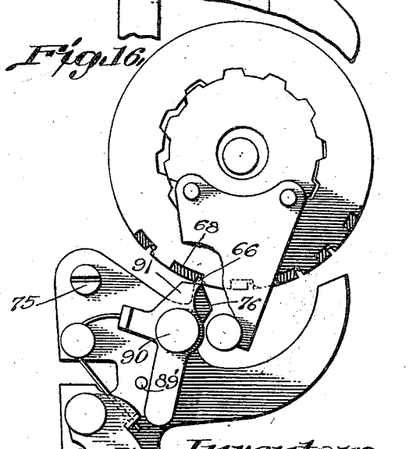

For the purpose of releasably holding the driving mechanism from operation there is provided a stop lever 74, shown in detail in Figure 12, and in operative position in Figure 6. The stop lever 74 is pivoted to the base plate 39 at 75, and has at its upper end a nose or dog 76 for engaging the notches 66 of the compensator wheel 64. The nose 76 is normally held against the wheel 64 by means of a coil spring 77 having one end thereof attached to the lower extremity of the stop lever 74, as at 78, and the other end anchored to the cover plate 79, which, as shown in Figure 4, is spaced from and secured to the base plate 39. Near the lower end of the stop lever 74 there is provided a shoulder 80, which, due to the action of spring 77, is normally pulled into engagement with one of the teeth of the stop disk 61. A slot 81 is provided at the lower end of stop lever 74, which slides on a pin 82, mounted on a base plate 39, for the purpose of guiding the lever 74. A guide arm 82' is formed at the upper end of the stop lever and bears against a guide pin 83. Pivotally mounted at 84 on an upstanding arm 85 of the lever 74, is a pawl 86, which is normally held in the position shown in Figures 4 and 7, bearing against a stop pin 87, by means of one end of a coil spring 88. A second pawl 89 is pivoted at 90 upon the upper end of the lever 74, and said pawl is provided with a nose 91 for engagement with the notches 68 in the ring 67. The nose 91 is normally forced into engagement with the ring 67 by the opposite end of the spring 88 as shown clearly in Figure 4. A stop pin 89' is provided on the lever 74 which limits the movement of pawl 89 in one direction.

Pivoted upon the cover plate 79 is a pawl 92, one end of which is notched as at 93 for the reception of the upper end of the operating lever 26. A disk 94 holds the pawl 92 on the plate 79. The nose of the pawl 92 is so located as to engage the pawl 86 and to move the same when motion is imparted to the lever 26 thru the shaft 21.

The operation of the mechanism described is as follows: The operator of the camera having first inserted a roll of film in the supply spool chamber 95, and having attached the free end of the film to the take up spool 43, then rotates the said take up spool 43 by hand thru the medium of the winding key 44 until the usual figure "1" printed on the black paper covering of the film, appears beneath the usual peep hole in the back of the camera. The nose 76 of the lever 74 should be positioned within the first of the series of notches in the ring 64. The spring motor should be wound tightly by turning the winding key 34, and then with the camera opened and lens carriage pulled out in the proper position, the camera is ready for operation. The operator finds his subject in the finder 6 in the usual manner and presses the wire release 8. This conveys a downward motion to the sliding bar 9, and upon such downward motion the shutter will be operated thru the medium of the connection between the shutter lever 13, and the upper part of the bar 9. The downward motion of the bar 9 also rocks the lever 20 downwardly and consequently the shaft 21. Such movement of the shaft 21 brings the lip 25 of the lever 24 into engagement with the adjusting screw 28, and thru this rocks the lever 26 to the left (in Figure 4) against the tension of the spring 29. This movement to the left, of the lever 26, rocks the pawl 92 upon its pivot causing the same to snap past the pawl 86, said pawl 86 being returned to the position shown in Figure 4 by the action of the spring 88. When the operator releases his pressure on the wire release 8, the lever 26 will be thrown back to the right by the spring 29, such movement causing the pawl 92 to engage the upper side of the pawl 86 and force the same to the left (in Figure 4). Because of the pawl 86 bearing against the pin 87 on the stop lever 74 the movement of the pawl 86 is thus imparted to the lever 74, which, rocking upon its pivot 75, disengages the shoulder 80 from the stop disk 61 and also the nose 76 from the notch 66 in the ring 64. This permits the spring motor to exert its force on the train of gears and thus to rotate the take up spool until the next notch in the compensator ring 64 reaches the nose 76. As soon as the ring 64 has moved sufficient distance to bring the next notch to the nose 76, said nose will immediately drop into the notch thus permitting the lever 74 to rock on its pivot, due to the action of spring 77 and thus bring the shoulder 80 into path of the teeth 62 and 63 on the stop disk 61. It may be noted here that by positioning the stop disk 61 and the cooperating shoulder 80 on the stop lever, remote from the motor or the source of power we have lessened to a marked degree the shock which necessarily results from a sudden stopping of the action of the motor; also that by correlating the stop disk 61 and the governor we have simplified this mechanism and provided for a more uniform and positive stop action than has hitherto been utilized.

It is well known in cameras of this character that due to the rapid snapping action by which the cameras are operated, frequently the releasing mechanism does not have time to release the motor and permit the winding of the film. In other words the releasing movement is so rapid that it often happens that the releasing mechanism snaps back into restraining position before the motor has had time to start its winding movement. To overcome this difficulty we have provided the pawl 89 and the ring 67. It will be noted by reference to Figure 4 that upon the movement of the lever 74 to withdraw the nose 76 from its notch 66, the nose 91 of the pawl 89 is also being withdrawn from its corresponding notch 68, which as shown, is slightly in advance of the corresponding notch 66. As soon as the nose 91 is withdrawn from its notch the spring 88, forcing the same towards the right in Figs. 4 and 7 until the tail of the pawl 89 engages the pin 89′ causes said nose 91 to engage upon the periphery of said ring 67 between the adjacent notches. Therefore as soon as the nose 91 engages upon the periphery of the ring 67, instantly upon the operation of the lever 74, the nose 76 is positively withheld from returning into its notch 66 until the compensator ring has been started by the action of the motor. Also due to the offsetting of the notches 66 and 68 the pawl 89 first drops into its corresponding notch thus relieving the pressure on the lever 74 and leaving the spring 77 free to pull the nose 76 into its proper notch when the same is presented. It will thus be seen that we have provided a novel and positive means for insuring the operation of the releasing mechanism when the same is actuated.

In conclusion, we believe we have here described and illustrated a novel, and practical automatic film winding camera, provided with a simple efficient and accurate compensating means, and a desirable type of governor for rendering such a camera serviceable for speedy and unfailing use. While the embodiment shown and described herein is the preferred form of our invention, it is to be understood of course that the same is susceptible to many changes in details of construction and parts, and we do not limit ourselves therefore to the exact form shown other than by the appended claims.

We claim—

1. In combination with a camera a film take up spool therein, a motor within said camera for rotating said spool, a train of gears connecting said motor and said spool, a stop mechanism operating upon said gear train for automatically stopping said motor after a predetermined rotation of said spool, a compensator controlling said stop mechanism comprising an internal gear ring having unevenly spaced notches in the outer periphery thereof with which said stop engages.

2. In combination with a camera, a film take up spool therein, a motor within said camera for rotating said spool, a train of gears connecting said motor and said spool, a stop mechanism operating upon said gear train for automatically stopping said motor after a predetermined rotation of said spool, a compensator controlling said mechanism comprising an internal gear ring having unevenly spaced notches in the outer periphery thereof, with which said stop engages, said compensator being driven by an eccentric gear from said motor.

3. In combination with a camera, a film take up spool therein, a motor within said camera for rotating said take up spool, means to compensate for the varying diameter of said spool as the film is wound thereon comprising a gear ring having unevenly spaced notches on the periphery thereof, said gear ring being driven by said motor thru a cam driving an internal gear mounted eccentrically to said gear ring.

4. In an automatic film winding camera including a motor and driving mechanism for the take up spool, a compensator therefor comprising an internal gear ring having unevenly spaced notches in the outer periphery thereof, and means driven by said motor for rotating said gear ring.

5. In an automatic film winding camera including a motor and driving mechanism for the take up spool, a compensator therefor comprising an internal gear ring having unevenly spaced notches in the outer periphery thereof, a gear for driving said ring mounted eccentrically thereof, and means driven by said motor for oscillating said gear.

6. In an automatic film winding camera including a motor and driving mechanism for the take up spool, a compensator therefor comprising an internal gear ring, having unevenly spaced notches in the outer periphery thereof, an oscillating gear mounted eccentrically of said ring for driving the same, and a cam rotated by said motor for actuating said gear.

7. In an automatic film winding camera including a motor and driving mechanism for the take up spool, a compensator comprising an internal gear ring, having unevenly spaced notches in the outer periphery thereof for cooperation with a releasing means, means for rotating said ring comprising a motor driven cam which oscillates a driving gear mounted eccentrically of said ring, a second ring superimposed upon said first mentioned ring having corresponding notches offset slightly from those in the first mentioned ring, and a pawl carried by said releasing means for engaging said offset notches, whereby the operation of said releasing means is insured.

8. In an automatic film winding camera including a motor and driving mechanism for the take up spool, a shutter operating mechanism a compensator ring driven by said mechanism, a pivoted stop lever having a part engaging said ring, means on said ring for rocking said lever to stopping position at predetermined periods of rotation of said ring, and means on said lever for engaging and stopping said mechanism, and means controlled by the shutter operating mechanism for releasing said stop lever.

9. In combination with a camera, a film take-up spool therein, a motor within said camera for rotating said take-up spool, restraining means normally preventing the operation of said motor including a notched ring, means for releasing said restraining means, and safety means including a second notched ring for insuring the operation of said releasing means.

10. In combination with a camera, a film take-up spool therein, a motor within said camera for rotating said take-up spool, restraining means normally preventing the operation of said motor including a notched ring, means for releasing said restraining means, and safety means including a pawl carried by said restraining means, and a second notched ring, for insuring operation of said releasing means.

EZRA C. CLARK.
JOHN F. POLHEMUS.